United States Patent [19]

Spiewak

[11] 3,960,818

[45] June 1, 1976

[54] ORDERED AROMATIC COPOLYAMIDE UREA POLYMER

[75] Inventor: John W. Spiewak, Akron, Ohio

[73] Assignee: The Firestone Tire & Rubber Company, Akron, Ohio

[22] Filed: Nov. 29, 1974

[21] Appl. No.: 528,307

[52] U.S. Cl. .................. 260/77.5 C; 260/77.5 D
[51] Int. Cl.$^2$ .................. C08G 71/02; C08G 63/62
[58] Field of Search .................. 260/77.5 C, 77.5 D

[56] References Cited
UNITED STATES PATENTS

| 2,833,744 | 5/1958 | Neher | 260/77.5 C |
|---|---|---|---|
| 2,973,342 | 2/1961 | Maba et al. | 260/77.5 C |
| 3,063,966 | 11/1962 | Kwolek et al. | 260/78 |
| 3,119,793 | 1/1964 | Maba et al. | 260/77.5 C |
| 3,164,571 | 1/1965 | Cotter | 260/77.5 C |
| 3,185,656 | 5/1965 | Gabler et al. | 260/77.5 C |
| 3,801,528 | 4/1974 | Morgan | 260/308 R |

FOREIGN PATENTS OR APPLICATIONS

| 530,267 | 12/1940 | United Kingdom | 260/77.5 C |

OTHER PUBLICATIONS

Encyclopedia of Polymer Science & Technology– vol. 6, pp. 506 and 508, Wiley–Interscience (N.Y.).

*Primary Examiner*—H. S. Cockeram

[57] ABSTRACT

An ordered copolyamide-urea-type polymer is prepared which is particularly useful for the production of synthetic fibers, films, etc. A representative polymer is that derived from p-phenylene terephthalamide and p-phenyleneurea. The polymer may contain nitrogen-substituted urea groups if the diamine which is reacted with urea is substituted at nitrogen with one or more lower alkyl groups such as methyl, ethyl, propyl, etc.

6 Claims, No Drawings

ORDERED AROMATIC COPOLYAMIDE UREA POLYMER

PRIOR ART

The 4,4'-diaminocarbonilide is disclosed as useful as a dye intermediate in U.S. Pat. No. 2,503,797 and British Pat. No. 639,021.

SUMMARY OF THE INVENTION

Polymers suitable for the preparation of synthetic fibers, films, etc. are produced by condensation of one molecular equivalent of an aromatic acid chloride and one molecular equivalent of the reaction product of urea and one or more aromatic diamines. A wide variety of diacid chlorides and diamines may be used.

The general formula for the polymer is

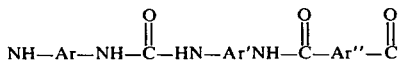

in which Ar, Ar' and Ar'' are aromatic groups, and Ar and Ar' may be the same or different. Ar and Ar'' may each be m- or p-phenylene or diphenylene X in which X represents sulfonyl, oxygen, methylene or a co-valent bond, and Ar'' is m- or p-phenylene or 2,6-dinaphthyl.

Such polymers are described as ordered because the diacid chloride always reacts with a diamino terminated urea, with the production of no substantial amount of any by-product other than the normal condensation product, hydrochloric acid. In the copolymer, an ordered sequence of amide-Ar-urea-Ar' -amide-Ar'' units results because of the chosen monomers. The positions of the Ar and Ar' groups are interchangeable.

Diacid Chlorides

The diacid chloride is preferably terephthaloyl chloride, but a wide variety of diacid chlorides may be used, including isophthaloyl chloride or 2,6-naphthylene dicarbonyl chloride. Diacid bromides and fluorides can be used instead of the chlorides, but are not commercial. The diacid chlorides can be represented by the following general formulae:

Diacid Chlorides

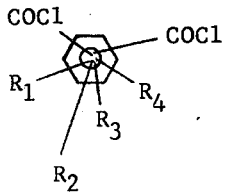
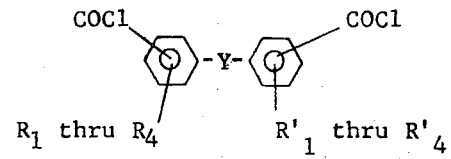

I
II

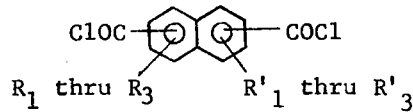
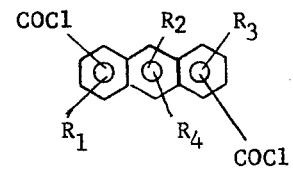

III
IV in which Y in structure II may be sulfonyl, oxygen, carbonyl, carbonate, sulfide, disulfide, sulfinyl, azo or $(CH_2)_n$ in which $n$ is 1 to 50. The alkylene moiety designated as $(CH_2)_n$ may also contain one or more sites of unsaturation which may be isolated or conjugated with each other. Y may be aralkyl or may contain one or more aryl groups or heteroaryl groups dispersed in the alkylene chain. The Y-chain may also contain one or more sulfide, sulfonyl, ether or carbonyl groups dispersed regularly or irregularly in the alkylene backbone. Hydrogen atoms in the alkylene chain may be substituted by chlorine, fluorine, bromine, iodine and other groups including nitro, nitroso, alkoxy, aryloxy, carboalkoxy, carboaryloxy, alkyl, aryl and heteroalkyl and heteroaryl. $R_1$ through $R_4$ and $R'_1$ through $R'_4$ in structures I through III may be hydrogen, alkyl, aryl, heteroalkyl, heteroaryl, alkenyl and alkynyl groups in any desired substitution pattern and may also be one or more of the four halogens, nitro, nitroso, alkoxy, aryloxy, carboalkoxy and carboaryloxy. Any or all can be hydrogen in any substitution pattern.

Some examples of diacid chlorides include:

Structure I-Type Diacid Chlorides

Terephthaloyl, isophthaloyl, nitroterephthaloyl, 4-nitroisophthaloyl, 2,5-dimethylterephthaloyl, 4-methoxyisophthaloyl and chloroterephthaloyl.

Structure II-Type Diacid Chlorides

Oxydiphenyl-4,4'-dicarbonylchloride, sulfonyldiphenyl-4,4'-dicarbonylchloride, 1,3-propanediphenyl-4,4'-dicarbonylchloride, 2-butene-1,4-diphenyl-4,4'-dicarbonyl chloride, biphenyl-2-chloro-3,3'-dicarbonyl chloride, oxydiphenyl-5,5'-dimethyl-3,3'-dicarbonyl chloride, sulfonyldiphenyl-3,3'-diethoxy-4,4'-dicarbonyl chloride, oxybis(3-phenylethylene-4-carbonyl chloride) and 1-pentene-3-ynl-1,5-diphenyl-4,4-dicarbonyl chloride.

Structure III-Type Diacid Chlorides

Naphthalene-2,6-dicarbonyl chloride, 1,5-dicarbonyl chloride, 1,4-dicarbonyl chloride, 2,6-dimethylnaphthalene-1,5-dicarbonyl chloride, 1,5-dichloronaphthalene-2,6-dicarbonyl chloride and 3,7-dinitronaphthalene-1,5-dicarbonyl chloride.

Structure IV-type Diacid Chlorides

Anthacene-9,10-dicarbonyl chloride, anthracene-1,5-dicarbonyl chloride, anthracene-2,6-dicarbonyl chloride and anthracene-1,4-dicarbonyl chloride.

The Aromatic Diamines

The aromatic diamines may be m- or p-phenylene diamine, sulfonyl 4,4'-dianiline, methylene dianiline, oxydianiline, or the like. More generally, the aromatic diamines which may be utilized in the reaction with urea include:

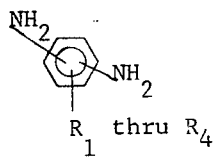

$R_1$ thru $R_4$

I

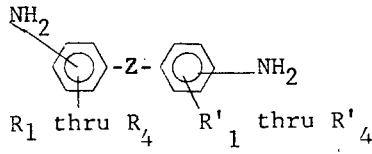

$R_1$ thru $R_4$   $R'_1$ thru $R'_4$

II

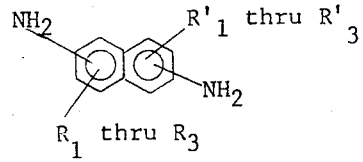

$R_1$ thru $R_3$

III

Some examples of aromatic diamines include:

Type I

The diamines with a single aromatic nucleus include p-phenylenediamine, m-phenylenediamine, 2,5-dichloro-p-phenylene-diamine, 2,4-diaminotoluene, 5-nitro-m-phenylenediamine, 5-chloro-m-phenylenediamine, N,N'-dimethyl-p-phenylenediamine, N,N'-diethyl-m-phenylene-diamine, N-methyl-p-phenylenediamine, and N-ethyl-m-phenylenediamine, etc.

Type II

Aromatic nuclei joined by Z include compounds in which Z may be sulfonyl, oxygen, carbonyl, carbonate, sulfide, disulfide, sulfinyl, azo or $(CH_2)_n$ in which $n$ is 1 to 50, and the alkylene moiety represented by $(CH_2)_n$ may contain one or more unsaturated sites which may be isolated or conjugated with respect to one another. Z may also be aralkyl. Hydrogen atoms in the alkylene chain may be substituted by chlorine, fluorine, bromine and other groups including alkoxy, aryloxy, etc. $R_1$ through $R_4$ and $R'_1$ through $R'_4$ may be hydrogen alkyl, aryl, heteroalkyl, heteroaryl, alkenyl and alkynyl groups in any desired substitution pattern* and may also be chlorine, bromine, iodine, nitro, nitroso, alkoxy, aryloxy, carboalkoxy or carboaryloxy. Representative compounds include methylenedianiline, 4,4'-diaminobenzophenone, 4,4'-diaminodiphenyl sulfoxide, 4,4'-diaminoazobenzene, etc.

*Substitution pattern refers to the relative positions on the rings of the various $R_1$ through $R_4$ and $R'_1$ through $R'_4$ groups. The groups can be in adjacent or opposite positions on any given ring and anything else in between.

Type III

Compounds of fused aromatic nuclei, include for instance, 1,4-diaminonaphthalene, 1,5-diaminonaphthalene, 2,6-diaminonaphthalene, 1,3-diaminonaphthalene, 5-chloro-1,4-diaminonaphthalene, 6-chloro-1,4-diaminonaphthalene, 3-chloro-1,5-diaminonaphthalene, 2-methoxy-1,5-diaminonaphthalene, 2-bromo-1,4-diaminonaphthalene, 2-methyl-1,5-diaminonaphthalene, 2-carbomethoxy-1,4-diaminonaphthalene, 4-phenoxy-1,5-diaminonaphthalene.

The reaction products of urea and aromatic diamines are known, and are disclosed in the U.S. patent cited as prior art. Other aromatic diamines will react with the urea in an analogous manner. Any reaction product may be reacted with an equivalent molecular weight of the aromatic diacid chloride in the production of the polymers. The reaction can be carried out in the range of $-20°$ to $100°$ C., and preferably at about $0°$ to $30°$ C.

Synthetic fibers may be produced from the polymers by any known process and are valuable as reinforcing elements in pneumatic tires, etc. Other uses for the reaction products of this invention are in the production of films, etc.

The reaction of urea with the aromatic diamine which is preferably carried out in boiling water, is represented by the following equation:

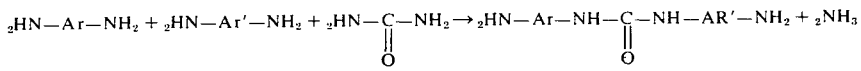

in which Ar may or may not equal Ar'. In the compound produced by the example, Ar and Ar' are both p-phenylene and the product is 4,4'-diaminocarbanilide.

The aromatic diamine produced by the foregoing equation is reacted with a diacid chloride and yields the polymer illustrated by the following formula:

in which Ar and Ar' are the same or different.

The following examples are illustrative.

EXAMPLE 1

PREPARATION OF 4,4'-DIAMINO CARBANILIDE

To a 1-liter, 3-neck round-bottom flask equipped with a mechanical stirrer, nitrogen inlet tube extending below the liquid level and a reflux condenser with a nitrogen exit to a gas bubbler, was added 500 ml. of distilled water. After the water was de-oxygenated by bubbling nitrogen gas through it for 3 hours, 15 g. (0.25 mole) of a commercial pre-dried urea and 60 g. (0.554 mole) of purified p-phenylenediamine were added and the solution which formed was refluxed for about 72 hours under a nitrogen atmosphere. The diamine to urea mole ratio utilized was 2.22.

The product precipitated after several hours as an almost white solid and after 72 hours the reaction mixture was suction filtered while still warm (50°–60° C.). The solid, after washing with hot water and drying overnight in a vacuum oven, amounted to 52.7 g., which represents an 87 per cent yield based on urea. The solid does not melt in an open melting point capillary but instead undergoes oxidative darkening at 250° C. The same compound prepared by an alternative route (Chem. Abstr. 52, 5321i [1958]) was reported not to melt up to 315° C. The identity of the compound was established by nitrogen elemental analysis.

EXAMPLE 2

SOLUTION POLYMERIZATION OF 4,4'-DIAMINOCARBANILIDE WITH TEREPHTHALOYL CHLORIDE; PREPARATION OF POLY p-PHENYLENE TEREPHTHALAMIDE-UREA

To a solution of 5.88 g. (0.024 mole) of 4,4'-diaminocarbanilide, prepared as above in 108 ml. of an N-methylpyrrolidone-hexamethylphosphoramide solvent mixture (2:1 by volume) at 8° C. under a nitrogen atmosphere, was added a terephthaloyl chloride (4.93 g.; 0.024 mole) solution (same solvent mixture) in 5 seconds. An exotherm to 24° C. immediately occurred in spite of the cooling ice bath surrounding the reaction vessel. The ice bath was removed and after 2 hours the temperature in the reaction vessel reached 32° C., indicating a slow reaction was occurring. The moderately viscous yellow solution was heated to 55° C. in about 30 minutes and after cooling to room temperature no further increase in viscosity was visually apparent. Very small amounts of terephthaloyl chloride solution were incrementally added but no significant change in viscosity was observed. The polymer solution was poured into a blender containing water, and after vigorous stirring the polymer which precipitated was suction-filtered and then washed three additional times with copious amounts of water. After drying the filtered polymer overnight in the vacuum oven at 60° C., a quantitative yield of poly p-phenylene terephthalamide-urea was obtained. It has an inherent viscosity of 0.90 (½ percent measured on grams/deciliter) in conc. $H_2SO_4$ at 25° C.).

Under the conditions of the polymerization, no reaction can occur other than the reaction to yield the ordered copolyamide-urea described. The product was not analyzed and shown to be an ordered polymer which may be an impossible task.

Other aromatic diamines may be reacted with urea by a similar procedure to produce the aromatic diamino-urea illustrated in equation No. 1. The aromatic diamino urea reaction products obtained in this way may be similarly reacted with aromatic diacid chloride and ordered polymers necessarily result. Fibers produced from such polymers of high aromatic content have the potential of having higher modulus than conventional aliphatic polyamide such as nylon 6 or nylon 66. Higher modulus is desired particularly in the reinforcement of belts in pneumatic tires. They also have the potential of having a higher tensile strength.

I claim:

1. An ordered copolymer having the formula

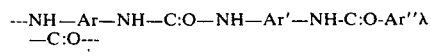

in which Ar and Ar' are of the class consisting of (a) arylene and (b) diarylene X groups in which X may be a covalent bond or a group from the class consisting of sulfonyl, oxygen, alkylene of 1 to 10 carbon atoms, and Ar" is the residue of diacid chloride after removal of the chlorine atoms of the formula

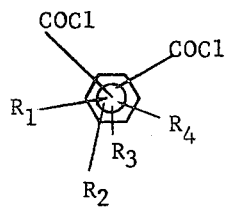

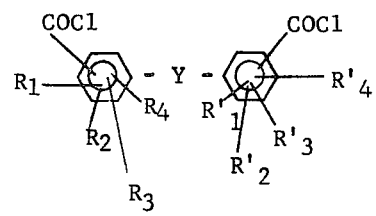

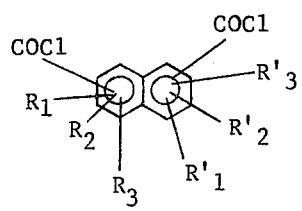

or

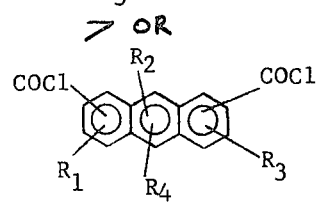

in which Y is from the class consisting of sulfonyl, oxygen, carbonyl, carbonate, sulfide, disulfide, sulfinyl, azo, $(CH_2)_n$ in which $n$ may be 1 to 50 and $(CH_2)_n$ is representative of an alkylene or unsaturated moiety in which the unsaturation may be isolated or the carbon groups may be conjugated with each other and $R_1$, $R_2$, $R_3$, $R_4$, $R'_1$, $R'_2$, $R'_3$ and $R'_4$ are from the class consisting of hydrogen, alkyl, aryl, heteroalkyl, heteroaryl, alkenyl and alkynyl.

2. The polymer of claim 1 in which Ar and Ar' are both p-phenylene.

3. The polymer of claim 1 in which Ar'' is terephthaloyl.

4. A fiber of the polymer of claim 1.

5. A fiber of the polymer of claim 2.

6. A fiber of the polymer of claim 3.

* * * * *